United States Patent
Pandraud et al.

(10) Patent No.: US 10,481,019 B2
(45) Date of Patent: Nov. 19, 2019

(54) METHOD AND DEVICE FOR DETERMINING THE HEAT LOSS COEFFICIENT OF A PREMISES

(71) Applicant: SAINT-GOBAIN ISOVER, Courbevoie (FR)

(72) Inventors: Guillaume Pandraud, Paris (FR); Florent Alzetto, Levallois Perret (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 435 days.

(21) Appl. No.: 15/109,063

(22) PCT Filed: Dec. 29, 2014

(86) PCT No.: PCT/FR2014/053571
§ 371 (c)(1),
(2) Date: Jun. 29, 2016

(87) PCT Pub. No.: WO2015/101751
PCT Pub. Date: Jul. 9, 2015

(65) Prior Publication Data
US 2016/0327439 A1    Nov. 10, 2016

(30) Foreign Application Priority Data
Dec. 30, 2013    (FR) ..................... 13 63712

(51) Int. Cl.
G01K 17/20    (2006.01)
(52) U.S. Cl.
CPC ................... *G01K 17/20* (2013.01)

(58) Field of Classification Search
None
See application file for complete search history.

(56) References Cited

U.S. PATENT DOCUMENTS

| | | | |
|---|---|---|---|
| 7,720,635 B2 * | 5/2010 | Donath | G01K 17/20 165/11.1 |
| 2006/0165151 A1 * | 7/2006 | Esprimont | G01K 17/00 374/29 |

(Continued)

FOREIGN PATENT DOCUMENTS

| | | | | |
|---|---|---|---|---|
| EP | 0 852 331 A1 | | 7/1998 | |
| EP | 0852331 A1 * | | 7/1998 | G01K 17/04 |

(Continued)

OTHER PUBLICATIONS

International Search Report dated Mar. 30, 2015 in PCT/FR14/053571 Filed Dec. 29, 2014.

*Primary Examiner* — John E Breene
*Assistant Examiner* — Brandon J Becker
(74) *Attorney, Agent, or Firm* — Oblon, McClelland, Maier & Neustadt, L.L.P.

(57) ABSTRACT

A method for determining a heat loss coefficient of a premises includes undertaking application of first and second heating powers, respectively, in the premises over two successive time periods, selecting for each of the first and second time periods, a time interval for which the evolution is substantially linear, determining the slope of the tangent to the curve $(T_{ik}(t))_{k=1 \text{ or } 2}$ over each time interval; and deducing the value of the heat loss coefficient of the premises on the basis of the slopes.

23 Claims, 4 Drawing Sheets

(56) References Cited

U.S. PATENT DOCUMENTS

| | | | | |
|---|---|---|---|---|
| 2007/0235550 A1* | 10/2007 | Donath | ............... | G01K 17/06 |
| | | | | 237/1 R |
| 2012/0330626 A1* | 12/2012 | An | ..................... | G01K 17/20 |
| | | | | 703/2 |
| 2013/0226503 A1* | 8/2013 | Mangematin | ......... | G01N 25/00 |
| | | | | 702/136 |

FOREIGN PATENT DOCUMENTS

| | | |
|---|---|---|
| EP | 2 674 737 A2 | 12/2013 |
| WO | 2012/028829 A1 | 3/2012 |
| WO | WO 2012028829 A1 * 3/2012 ............. G01K 17/20 |

\* cited by examiner

METHOD AND DEVICE FOR DETERMINING THE HEAT LOSS COEFFICIENT OF A PREMISES

The present invention relates to a method and a device for determining the heat loss coefficient of a premises. Within the meaning of the invention, a premises is an individual house or a building, in particular for residential or tertiary use, or else a part of such a building, for example an apartment in a building with multiple floors.

The heat loss coefficient of a premises, denoted K, is equal to the heat loss power of the premises (in Watts) per degree (Kelvin or Celsius) of difference between the temperature of the air inside the premises and the temperature of the outside air. This coefficient K is representative of the energy performance of the envelope of the premises.

The heat loss coefficient K of a premises is influenced, on the one hand, by the heat losses by transmission through the walls of the premises and, on the other hand, by infiltrations of air. The heat losses by transmission are represented by a factor $H_T=UA_T$, where U is the heat transfer coefficient of the envelope of the premises, also called specific heat transfer coefficient by transmission of the premises, and $A_T$ is the total area of the walls of the premises. The infiltrations of air into the premises are represented by a factor m'·Cp, where m' is the air renewal flow rate and Cp is the heat capacity of the air. Consequently, the heat loss coefficient K is given by the relation:

$$K=H_T+m'\cdot Cp=UA_T+m'\cdot Cp.$$

The coefficient U is used, within the framework of thermal regulations such as RT 2005 in France or the regulation EnEV in Germany, to estimate the overall energy consumption of the premises. Its determination is useful in order to perform a diagnosis of the thermal insulation of a premises, in particular after its construction, to verify that the constructor has adhered to the standards in force in terms of thermal insulation both as regards the choice of the materials and their implementation, or when a refurbishment of the premises is considered, with a view to evaluating the measures that should be taken to improve the thermal performance.

WO 2012/028829 A1 describes a method for determining the heat loss coefficient K of a premises, in which use is made of the transient variations of the inside temperature of the premises when it is subjected to controlled internal impulses and in a measured external environment. Quantitative analysis of the variation of the inside temperature of the premises, obtained by in situ measurements, makes it possible to quantitatively determine the energy quality of the premises over a relatively short period, thereby making it possible to circumvent the influence of the conditions of use of the premises and of the variations of the outside climatic conditions. In practice, it has been demonstrated that this method provides good results when it is implemented with a measurement time corresponding to two consecutive nights. The reduction in the measurement time is however tricky. In particular, it is apparent that the error in the value of the heat loss coefficient K is liable to increase as the measurement time decreases.

It is these drawbacks that the invention is intended more particularly to remedy by proposing a method and a device making it possible to determine the heat loss coefficient of a premises over a short time, in particular over a single night or even over a few hours, with good accuracy, in particular of the order of ±20%.

For this purpose, a subject of the invention is a method for determining the heat loss coefficient K of a premises, characterized in that it comprises steps in which:
there is undertaken, in the premises, over two successive time periods $D_1$ and $D_2$:
i. over the first time period $D_1$, the application of a first heating power $P_1$ of the premises, and a campaign of measurements of at least one temperature inside the premises $T_{i1}$ at closely-spaced time intervals, as well as the determination of the temperature of the outside air $T_{e1}$ at closely-spaced time intervals, the first heating power $P_1$ being such that the parameter $$\alpha = 1 - \frac{\Delta T_1(0)K_{ref}}{P_1}$$

is less than or equal to 0.8 with $\Delta T_1(0)=T_{i1}(t=0)-T_{em}$, where $t=0$ is the starting point of the first time period $D_1$, $T_{em}$ is the average temperature of the outside air over all of the time periods $D_1$ and $D_2$ and $K_{ref}$ is a reference value of the heat loss coefficient K of the premises, and then
ii. over the second time period $D_2$ the application of a substantially zero second heating power $P_2$ of the premises, in such a way as to allow the temperature inside the premises $T_{i1}$ to evolve freely, and a campaign of measurements of at least one temperature inside the premises $T_{i2}$ at closely-spaced time intervals, as well as the determination of the temperature of the outside air $T_{e2}$ at closely-spaced time intervals;
for each of the first and second time periods $D_1$ and $D_2$, a time interval $\Delta t_1$ or $\Delta t_2$ is selected for which the evolution $T_{i1}(t)$ or $T_{i2}(t)$ is substantially linear, where the time intervals $\Delta t_1$ and $\Delta t_2$ are such that the time interval $\Delta t_1$ extends up to the end of the first period $D_1$ of application of the first heating power $P_1$ and such that, when the starting points of the first period $D_1$ and of the second period $D_2$ are superimposed, the time intervals $\Delta t_1$ and $\Delta t_2$ have the same end point;
the slope $a_1$ or $a_2$ of the tangent to the curve $(T_k(t))_{k=1 \text{ or } 2}$ over each time interval $\Delta t_1$ or $\Delta t_2$ is determined;
the value $K_{calc}$ of the heat loss coefficient K of the premises is deduced on the basis of the slopes $a_1$ and $a_2$.

Preferably, the time intervals $\Delta t_1$ and $\Delta t_2$ have the same duration.

Of course, the method according to the invention does not necessarily require the employment of a graphical representation of the evolution $T_{ik}(t)$.

In particular, over each time interval $\Delta t_k$, the slope $a_k$ of the tangent to the curve $T_{ik}(t)$ is equal to the derivative of the evolution $T_{ik}(t)$ over the interval $\Delta t_k$. Hence, the step of determining the slope $a_k$ of the tangent to the curve $T_{ik}(t)$ over the time interval $\Delta t_k$ can be carried out, within the framework of the invention, by computing the derivative of the evolution $T_{ik}(t)$ over the time interval $\Delta t_k$, without resorting to a graphical representation of the evolution $T_{ik}(t)$.

The computation steps of the method, in particular for the determination of the slopes $a_k$, can be implemented with the aid of any appropriate computation means. This may entail in particular an electronic computation unit which is connected to an acquisition system for acquiring the measurements required by the method and which comprises computation means for executing all or some of the computation steps of the method on the basis of the measurements acquired.

Within the framework of the invention, the expression "heating power of the premises" is intended to mean any operative condition generating a variation of the inside temperature of the premises for given conditions of outside temperature. It is understood that the heating power may be positive, zero or negative. A positive heating power corresponds to a supply of heat into the premises, whilst a negative heating power corresponds to a supply of cold into the premises.

According to the invention, provision is made for the first heating power $P_1$ to be a strictly positive or strictly negative power suitable for generating a forced evolution of the temperature inside the premises, whilst the second heating power $P_2$ is a substantially zero power. Within the meaning of the invention, a heating power is said to be substantially zero when it permits free evolution of the temperature inside the premises. In general, the second heating power $P_2$ is not strictly zero, on account in particular of the presence in the premises of measurement or computation hardware which are used for the implementation of the method and which generate a residual heating power when operating. In the case of a substantially zero heating power, the variation of the inside temperature of the premises may result from a difference between the inside temperature of the premises and the outside temperature, or else from a variation of the outside temperature.

The invention relies on the selection of a specific thermal impulse in the premises making it possible to access its heat loss coefficient with good accuracy and over a reduced time, this specific thermal impulse being the application of a strictly positive or strictly negative first heating power $P_1$ suitable for generating a forced evolution of the temperature inside the premises, followed by the application of a substantially zero second heating power $P_2$ permitting free evolution of the temperature inside the premises.

As described in WO 2012/028829 A1, the determination of the heat loss coefficient K of a premises is based, within the framework of the invention, on the modeling of the premises according to an R-C model with one resistor and one capacitor. The premises is considered to be an isothermal box characterized, on the one hand, by its heat loss coefficient K, which is the inverse of a resistance, and, on the other hand, by its effective heat capacity C or inertia. The effective heat capacity C of a premises, for a thermal impulse in the premises at constant power, corresponds to the heat capacity of the materials situated in the insulating envelope of the premises and is defined as the energy required to increase the ambient temperature of the premises by 1 K at constant outside temperature for the duration of the impulse.

For each time period $(D_k)_{k=1 \text{ or } 2}$, the inside temperature of the premises $T_{ik}$ is assumed homogeneous. The evolution of the temperature difference between the inside and the outside $\Delta T_k = T_{ik} - T_{ek}$ follows an exponential behavior, according to the equation:

$$Cd\Delta T_k = (P_k - K\Delta T_k)dt \quad (1)$$

with K the heat loss coefficient of the premises,

C the effective heat capacity of the premises, $P_k$ the heating power of the premises, $\Delta T_k$ the temperature difference between the inside and the outside.

In accordance with equation (1), the slope $a_k$ of the tangent to the curve representative of the evolution of the quantity $\Delta T_k = T_{ik} - T_{ek}$ as a function of time is therefore given by:

$$a_k = \frac{d\Delta T_k}{dt} = \frac{P_k - K\Delta T_k}{C}.$$

In practice, within the framework of the method of the invention, in each time period $D_k$, a time interval $\Delta t_k$ is sought for which the evolution $T_{ik}(t)$ is substantially linear. Over this time interval $\Delta t_k$, it may be considered that the temperature of the outside air $T_{ek}$ is substantially constant and equal to the average temperature $T_{em}$ of the outside air over all of the time periods $D_1$ and $D_2$. Furthermore, as a time interval $\Delta t_k$ is selected in the heating period $D_k$, it is possible to consider an average value $T_{ikm}$ of $T_{ik}(t)$ over the time interval $\Delta t_k$ in the expression for the slope $a_k$. Hence, the slope $a_k$ is given by:

$$a_k = \frac{P_k - K\Delta T_{km}}{C}, \text{ with } \Delta T_{km} = T_{ikm} - T_{em}.$$

Thus, it is possible to access a value $K_{calc}$ of the heat loss coefficient of the premises by applying, over two successive time periods $D_1$ and $D_2$, two heating powers $P_1$ and $P_2$ of different values, and by measuring the evolution of at least one temperature inside the premises $T_{i1}(t)$ or $T_{i2}(t)$ over each of these two time periods. For each time period $D_1$ or $D_2$, a time interval $\Delta t_1$ or $\Delta t_2$ is selected for which the evolution $T_{i1}(t)$ or $T_{i2}(t)$ is substantially linear, and the slope $a_1$ or $a_2$ of the tangent to the curve $(T_{ik}(t))_{k=1 \text{ or } 2}$ is determined over this time interval $\Delta t_1$ or $\Delta t_2$. The value $K_{calc}$ of the heat loss coefficient of the premises is then given by:

$$K_{calc} = \frac{a_1 P_2 - a_2 P_1}{a_1 \Delta T_{2m} - a_2 \Delta T_{1m}}. \quad (2)$$

It has been noted experimentally that the error in the value $K_{calc}$ of the heat loss coefficient determined by a two-phase test as described hereinabove is liable to increase as the measurement time is reduced. With the aim of reducing the measurement time while limiting the error in the value $K_{calc}$, a study has been conducted to evaluate the influence of the conditions in which the test takes place on the accuracy of the value $K_{calc}$ obtained.

For this purpose, the inventors have employed a simplified diffusive model, in which is considered a homogeneous layer of material of thickness e, comprising an external face and an internal face. This layer is subjected to a two-phase test, comprising a first phase, in which the internal face of the layer is subjected to a first constant heating power $P_{h1}$ for a heating time going from 0 to $t_h$, and a second phase, in which the internal face of the layer is subjected to a second constant heating power $P_{h2}$ different from $P_{h1}$ for a heating time going from $t_h$ to $2t_h$. The external face of the layer is maintained at constant temperature for the duration of the test. If the layer is in a static initial state with a temperature difference $\Delta T(0) = T_{int}(t=0) - T_{ext}(t=0)$, the evolution of the temperature of the internal face is given by:

$$T_{int}(t) = \begin{cases} \forall\ 0 \le t \le t_h, & P_1 R - (P_1 - \Delta T(0)K)\sum_{j\ge 0} R_j e^{-t/\tau_j} \\ & P_2 R - (P_1 - \Delta T(0)K)\sum_{j\ge 0} R_j e^{-t/\tau_j} - \\ \forall\ t_h < t \le 2t_h, & \\ & (P_2 - P_1)\sum_{j\ge 0} R_j e^{-(t-t_h)/\tau_j} \end{cases} \quad (3)$$

with $\tau_j$ the intrinsic time constants of the layer such that:

$$\forall\ j \ge 0, \tau_j = RC\frac{4}{\pi^2(2j+1)^2},$$

$R_j$ the associated weights, dimensionally equivalent to a thermal resistance, such that:

$$\forall\ j \ge 0, R_j = R\frac{8}{\pi^2(2j+1)^2},$$

where $$R = \frac{e}{S\lambda}$$

and $C = e\, S\rho\, Cp$, with $\lambda$ the thermal conductivity of the layer, $\rho$ the density of the layer, S the area of the layer and Cp the heat capacity of the air.

In order to understand the way in which the various time constants affect the value $K_{calc}$ of the heat loss coefficient determined by a two-phase test such as described above, the inventors have inserted equation (3) into equation (2), thereby giving:

$$K_{calc} = K\frac{1}{1 - \beta\frac{P_{h1}(P_{h1} - \Delta T(0)K)}{P_{h1}^2 - P_{h2}\Delta T(0)K}g_B(t_h)} \quad (4)$$

where $\beta$ is a dimensionless parameter such that $$\beta = \frac{(P_{h1} - \Delta T(0)K)^2}{P_{h1}^2 - P_{h2}\Delta T(0)K};$$

$f_B(t_h)$ and $g_B(t_h)$ are functions depending solely on the premises and on the heating time $t_h$, which are monotonic functions which decrease as the heating time increases, and such that $0 < f_B(t_h)$ and $0 < g_B(t_h) \le 1$.

The inventors have thus noted, on the basis of the expression (4), that the value $K_{calc}$ of the heat loss coefficient determined by a two-phase test such as described above is equal to the heat loss coefficient K of the layer, multiplied by a corrective factor depending on the parameter $\beta$. In particular, the error in the value of $K_{calc}$ is minimized as the parameter $\beta$ tends to 0.

For practical reasons, the inventors were interested in the configurations where one of the heating powers $P_{h1}$ and $P_{h2}$ is zero.

In the first configuration where the first heating power $P_{h1}$ is zero, the dimensionless parameter which occurs in the expression for $K_{calc}$ is:

$$\beta = -\frac{\Delta T(0)K}{P_{h2}}.$$

In this first configuration, the two-phase test leads to a value $K_{calc}$ which is overestimated if $\beta$ is positive and under-estimated if $\beta$ is negative. Moreover, the parameter $\beta$ decreases in absolute value, and therefore the accuracy in $K_{calc}$ increases, as the initial temperature difference $\Delta T(0)$ decreases or as the second heating power $P_{h2}$ increases.

In practice, these experimental conditions are not easy to implement for a real building, since the experimental conditions which have preceded the test and which may disturb the measurements are undergone. This is why consideration of the second configuration is preferred, where the impulse is forced with a non-zero first heating power $P_{h1}$, while the second heating power $P_{h2}$ is zero.

In this second configuration where the second heating power $P_{h2}$ is zero, the dimensionless parameter which occurs in the expression for $K_{calc}$ is:

$$\alpha = \sqrt{\beta} = 1 - \frac{\Delta T(0)K}{P_{h1}}.$$

The value $K_{calc}$ of the heat loss coefficient determined in the second configuration, by a two-phase test with a constant positive first heating power $P_{h1}$ and a zero second heating power $P_{h2}$, is then given by:

$$K_{calc} = K\frac{1}{1 - \alpha^2\frac{f_B(t_h)}{1 - \alpha g_B(t_h)}}. \quad (5)$$

In this second configuration, since the corrective factor $$\frac{1}{1 - \alpha^2\frac{f_B(t_h)}{1 - \alpha g_B(t_h)}}$$

is greater than or equal to 1, the two-phase test still leads to a value $K_{calc}$ which is overestimated with respect to the heat loss coefficient K of the layer. The expression (5) also makes it possible to see that the corrective factor decreases, and therefore the accuracy in $K_{calc}$ increases, as the heating time $t_h$ increases and as the parameter $\alpha$ decreases. Therefore, to improve the accuracy in the value $K_{calc}$, either the heating time $t_h$ should be increased, or the parameter $\alpha$ should be decreased.

The inventors have established experimentally, by undertaking series of two-phase tests with a constant positive first heating power $P_1$ and a substantially zero second heating power $P_2$ in various types of premises and by varying the value of the parameter $\alpha$ from test to test, that it is possible to obtain, for all the types of premises, good accuracy in the value $K_{calc}$, that is to say accuracy such that the value $K_{calc}$ lies in a ±20% bracket around K, while having a heating time of less than or equal to 4 hours, on condition that the parameter α remains less than or equal to 0.8. The heating time or the error may be further reduced by decreasing the parameter α.

Starting from this experimental finding, the invention proposes to determine the heat loss coefficient of a premises over a reduced time, while safeguarding good accuracy in the result, by employing the following measures:

The first heating power $P_1$ is chosen non-zero and such that the parameter $$\alpha = 1 - \frac{\Delta T_1(0) K_{ref}}{P_1}$$

is less than or equal to 0.8 where $\Delta T_1(0) = T_{i1}(t=0) - T_{em}$, with t=0 the starting point of the first time period $D_1$, $T_{em}$ is the average temperature of the outside air over the set of time periods $D_1$ and $D_2$, and $K_{ref}$ is a reference value of the heat loss coefficient K of the premises. It is considered here that the temperature of the outside air is stable over the time periods $D_1$ and $D_2$, so that the initial temperature of the outside air is substantially equal to the average temperature $T_{em}$ of the outside air over all of the time periods $D_1$ and $D_2$. It should be noted that the first heating power $P_1$ may be a positive power, when the initial temperature difference $\Delta T_1(0)$ of the premises is positive, or a negative power, when the initial temperature difference $\Delta T_1(0)$ of the premises is negative.

The time interval $\Delta t_2$ used for the processing of the data obtained over the second time period $D_2$, is chosen with an end point such that the duration between the starting point of the period $D_2$ and the end point of the interval $\Delta t_2$ is equal to the duration of the first time period $D_1$. It has indeed been noted experimentally that such symmetry of processing of the data improves the accuracy of the value $K_{calc}$. This corresponds to the conditions of the simplified diffusive model described above, where the two heating phases have the same duration.

In an advantageous manner, by applying the two criteria listed hereinabove, the first time period $D_1$ over which the first heating power $P_1$ is applied can have a duration of less than or equal to 4 hours, without this penalizing the accuracy in the value $K_{calc}$, which remains of the order of ±20% around K.

According to an advantageous characteristic, the first heating power $P_1$ of the premises comprises a heating power $P_{imp1}$, imposed by means of a controlled power source. If no power source other than that used to apply the imposed heating power $P_{imp1}$, is active in the premises in the course of the first time period $D_1$, the first heating power $P_1$ of the premises is equal to the imposed heating power $P_{imp1}$. If on the other hand there exists, in the course of the period $D_1$, an additional power $P_{sup1}$ in the premises on top of the power $P_{imp1}$, the first heating power $P_1$ is equal to $P_{imp1} + P_{sup1}$. In particular, in the case where the solar radiation over the first time period $D_1$ is significant, the contribution of the solar radiation to the heating of the premises forms part of the additional power $P_{sup1}$.

In practice, the conditions of implementation of the method are adapted to limit the additional supplies of power $P_{sup1}$ other than the imposed heating power $P_{imp1}$. Preferably, the method is implemented whilst the premises is unoccupied.

In an advantageous manner, the method is implemented over time periods $D_1$ and $D_2$ for which the solar radiation is low, preferably zero. In a preferred manner, the method is implemented over time periods $D_1$ and $D_2$ chosen during the night, or optionally during the daytime in the morning or the evening. It is thus possible to reduce the contribution of the solar radiation and to limit the fluctuations of the temperature of the outside air.

The time periods $D_1$ and $D_2$ can be either disjoint, or immediately successive. In the latter case, it may be considered that the method is carried out in its entirety over a continuous time period, formed by the succession of the time periods $D_1$ and $D_2$. In a preferred manner, with a view to limiting the implementation time of the method while reducing the contribution of the solar radiation, the method is carried out in its entirety continuously over a single nocturnal period.

Preferably, over each of the time periods $D_1$ and $D_2$, any fixed ventilation system fitted to the premises is deactivated and all the ventilation ports are closed or blocked off, so as to limit the exchanges of air with the outside.

As a variant, the fixed ventilation systems of the premises may operate in the course of the method over each of the time periods $D_1$ and $D_2$. However, this introduces an additional air renewal term into the expression for the heat loss coefficient K:

$$K = H_T + m'_1 \cdot Cp + m'_2 \cdot Cp,$$

where $m'_1$ the air renewal flow rate by infiltration and $m'_2$ the air renewal flow rate due to the fixed ventilation systems are correlated, the value of one depending on the value of the other.

Analysis of the experimental results makes it possible to define preferential criteria for the first heating power $P_1$ to be applied in the premises.

In particular, according to an aspect of the invention, the first heating power $P_1$ is preferably such that the parameter $$\alpha = 1 - \frac{\Delta T_1(0) K_{ref}}{P_1}$$

is less than or equal to 0.75, more preferably less than or equal to 0.7.

Preferably, the first heating power $P_1$ is such that the parameter $$\alpha = 1 - \frac{\Delta T_1(0) K_{ref}}{P_1}$$

is greater than or equal to 0.25, more preferably greater than or equal to 0.3. Indeed, for well insulated buildings, when the parameter α is less than 0.25 or 0.3, the sensitivity of the conventional measurement sensors does not make it possible to obtain satisfactory data relating to the evolution of the temperature inside the premises $T_{i1}$ over the first time period $D_1$, hence an increase in the error in the value $K_{calc}$.

According to a preferred characteristic, the first heating power $P_1$ is such that the parameter $$\alpha = 1 - \frac{\Delta T_1(0) K_{ref}}{P_1}$$

is substantially equal to 0.5. Analysis of the experimental results shows indeed that this value of the parameter α makes it possible to obtain, for all the types of premises, good accuracy in the value $K_{calc}$, in a ±20% bracket around K. The inventors have also noted experimentally that the necessity to decrease the parameter α in order to obtain good accuracy in the value $K_{calc}$ is all the more pronounced the more significant the inertia C of the premises and the more the heating time, that is to say the duration of the first time period $D_1$, decreases. In practice, the closer the parameter α is to 0.5, the better the accuracy in the value $K_{calc}$ and the less it depends on the inertia of the premises and the heating time.

When the parameter α is substantially equal to 0.5, the accuracy in the value $K_{calc}$ is all the better the longer the heating time. In particular, by choosing the first heating power $P_1$ such that the coefficient $$\alpha = 1 - \frac{\Delta T_1(0) K_{ref}}{P_1}$$

is substantially equal to 0.5 and a heating time of the order of 4 hours, it is possible to achieve an accuracy of the order of ±15% in the value $K_{calc}$.

The necessity to decrease the parameter α in order to obtain good accuracy in the value $K_{calc}$ with a short heating time is also more pronounced for premises exhibiting insulation on the outside than for premises exhibiting insulation on the inside.

In an advantageous manner, within the framework of the method of the invention, subsequent to the determination of the value $K_{calc}$ of the heat loss coefficient K of the premises on the basis of the slopes $a_1$ and $a_2$, the value of the parameter $$\alpha_{calc} = 1 - \frac{\Delta T_1(0) K_{calc}}{P_1}$$

is computed and it is verified that $\alpha_{calc}$ is indeed in the predefined range of values for the parameter α.

It is noted that the determination of the value of the first heating power $P_1$ to be applied over the first time period $D_1$ in order to satisfy the criteria on the parameter α makes it necessary to know a reference value $K_{ref}$ of the heat loss coefficient K of the premises.

A first process for accessing a reference value $K_{ref}$ of the heat loss coefficient K of the premises is the use of a quantity arising from a thermal analysis of the premises, in particular the use of the heat transmission or transfer coefficient of the envelope of the premises. Preferably, the heat transfer coefficient H of the envelope of the premises is determined using the standard ISO 13789:2007 "Thermal performance of buildings—Coefficients of heat transfer by transmission and by renewal of air—Computation process", and then the reference value $K_{ref}$ of the heat loss coefficient is deduced through the relation:

$$K_{ref} = H_T + H_V$$

where $H_T$ is the heat transfer coefficient by transmission and $H_V$ is the heat transfer coefficient by ventilation. Preferably, the heat transfer coefficient of the envelope of the premises is determined, according to the standard ISO 13789:2007 in the absence of ventilation in the premises. As a variant, the ventilation can be active in the premises, the ventilation flow rate then having to be measured or estimated.

The use of the standard ISO 13789:2007 is a preferred process for accessing a reference value $K_{ref}$ of the heat loss coefficient K of the premises. However, other processes are also conceivable, in particular when not all the necessary information on the premises required to apply the standard ISO 13789:2007 is available.

A second process for accessing a reference value $K_{ref}$ of the heat loss coefficient K of the premises when not all the necessary information on the premises required to apply the standard ISO 13789:2007 is available is to subject the premises to a quasi-static test, such as a "coheating" test.

"Coheating" is a quasi-static process whose objective is to measure the total heat loss of unoccupied premises. A "coheating" test involves heating the premises for several days, generally for one to three weeks, to a constant and homogeneous temperature, by virtue of electric radiators coupled to fans and connected to a regulating system. The temperature setting must be fairly high, of the order of 25° C., so as to have a temperature difference of at least 10° C. between the inside of the premises and the outside. When saturation is reached, that is to say when a quasi-static state is reached, the power P necessary to maintain the premises at a temperature of 25° C., the inside temperature $T_{int}$ and the outside temperature $T_{ext}$ are measured. The inside temperature $T_{int}$ can in particular be measured with the aid of thermocouples or thermistors, while the outside temperature $T_{ext}$ can be measured by virtue of a meteorological station. Processing the data then makes it possible to obtain a value $K_{ref}$ of the heat loss coefficient.

More precisely, the procedure is as follows:

Firstly, a first pressurization test takes place, which makes it possible to measure the losses due to ventilation and to infiltrations.

Thereafter, the openings such as the chimneys or the air vents are closed, so that the losses related to ventilation are no longer accessible to the measurement.

The premises is then heated electrically and homogeneously, until a high temperature setting, of the order of 25° C., is reached.

The power P, the inside temperature $T_{int}$ and the outside temperature $T_{ext}$ are then measured. Processing these measurements affords access to the losses by transmission and by infiltration.

Finally, a second pressurization test is carried out, so as to ascertain the heat losses due to infiltrations alone, the openings of the building being kept closed.

For the processing of the measurements, the power necessary to maintain the building at the temperature setting is averaged each day, over twenty-four hours, as is the temperature difference between the inside and the outside. These averaged data are then plotted on a graph giving the power as a function of the temperature difference. A correction, due to the solar radiation which also participates in heating the premises, has to be introduced. The slope of the straight line which passes through the origin is given by linear regression; it corresponds to the heat loss coefficient $K_{ref}$.

This "coheating" process is relatively simple to implement and provides a reference value $K_{ref}$ of the heat loss coefficient K of the premises directly. According to an advantageous variant, for lightweight buildings, "coheating" tests can be carried out at night, the correction due to the solar supplies not then having to be made.

A third process for accessing a reference value $K_{ref}$ of the heat loss coefficient K of the premises when not all the necessary information on the premises required to apply the standard ISO 13789:2007 is available is the use of a quantity arising from a study of the energy consumption of the premises. In particular, the reference value $K_{ref}$ can be determined as being the ratio of the energy consumed by the premises over a given time period to the product of the duration of the given time period and of the average temperature difference between the inside and the outside of the premises over the given time period.

In one embodiment of the method according to the invention, the slope $a_1$ or $a_2$ of the tangent to the curve $(T_{ik}(t))_{k=1\ or\ 2}$ is determined over each time interval $\Delta t_1$ or $\Delta t_2$ by computing the average of the slopes at each point of the time interval $\Delta t_1$ or $\Delta t_2$, the average being weighted by the uncertainty associated with each point.

In another embodiment of the method according to the invention, the slope $a_1$ or $a_2$ of the tangent to the curve $(T_{ik}(t))_{k=1\ or\ 2}$ is determined over each time interval $\Delta t_1$ or $\Delta t_2$ by identifying at least one usual mathematical function which regularizes the curve $(T_{ik}(t))_{k=1\ or\ 2}$ over the time interval $\Delta t_i$ and by computing the derivative of this function at the end point of the time interval $\Delta t_i$. The or each mathematical function which regularizes the curve $(T_{ik}(t))_{k=1\ or\ 2}$ over the time interval $\Delta t_i$ may be, in particular, an exponential or polynomial function.

According to an advantageous but not compulsory aspect, for each of the time periods $D_1$ and $D_2$, the campaign of measurements of the inside temperature of the premises $T_{ik}$ is carried out over a time period sufficient to obtain a variation of the inside temperature $T_{ik}$ of at least 1° C., preferably between 1° C. and 10° C.

According to an advantageous characteristic, the controlled power source for heating the premises may be a fixed item of equipment of the premises, that is to say a heating means installed in the premises independently of the implementation of the method, provided that this heating means is not very inert and can be adjusted so as to ensure fast heating of the premises. It may in particular be a heat pump whose coefficient of performance (COP) is known.

As a variant, the controlled power source for heating the premises may be a source brought into the premises specifically for the implementation of the method.

The heating elements for the premises may be of convective, conductive or radiative type, or may combine several of these technologies. Preferably, the heating elements are electrical appliances, thereby making it possible to determine the heating power in a direct and accurate manner. Examples of electrical heating appliances comprise in particular appliances of convective type involving the blowing of air heated by means of electrical resistors; heating mats or films; parasol radiant heaters. As a variant, the heating elements may be appliances that operate using gas or fuel oil, provided that the efficiencies of the burners and the fuel flow rates can be estimated in a sufficiently accurate manner to access the heating power.

In an advantageous embodiment, the heating elements for the premises are electric heating mats that are distributed in the premises by positioning them vertically and rolled up, so that the whole of the thermal power is dissipated into the air. This arrangement allows fast and homogeneous heating of the premises, ensuring that the ambient temperature is sufficiently close to the temperature of the walls inside the premises.

According to an advantageous characteristic, each campaign of measurements of the temperature inside the premises comprises measurements of the ambient temperature inside the premises, measurements of the temperature of walls of the premises and/or measurements of the mean radiant temperature inside the premises. In practice, any known measurement process can be used to access these temperatures, in particular the measurement processes described in the standard NF EN ISO 7726. By way of example, the measurements of the ambient temperature inside the premises and of the temperature of the walls of the premises can be carried out with the aid of thermocouples of type K or of Pt100 probes. For the measurements of the mean radiant temperature inside the premises, a black-globe thermometer can be used.

In an advantageous manner, when the heating of the premises ensures that the ambient temperature is sufficiently close to the temperature of the walls inside the premises, the ambient temperature inside the premises is measured.

If the heating of the premises is indeed homogeneous, so that the inside temperature is the same throughout the premises, or in all the rooms or zones of the premises if the latter comprises internal partitions, then the measurements of the temperature inside the premises may be limited to measurements inside a single room or zone of the premises.

If the method of the invention is implemented in a premises for which the heating is less homogeneous, it can be envisaged to measure the temperature in several rooms or zones of the premises and to consider that the temperature inside the premises at each time t is the average of the temperature measurements obtained at the time t in the various rooms or zones of the premises, on condition that they are not too different, which would indicate a lack of ventilation of the premises. It is also possible to make provision for several different temperature measurements in each room or zone of the premises. Thus, provision may be made to carry out in each room or zone at one and the same time a measurement of the ambient temperature and/or a measurement of the temperature of a wall of the envelope of the premises and/or a measurement of the mean radiant temperature.

Another possibility in case of less homogeneous heating is to measure the power and the temperature in each room or zone of the premises, so as to determine the heat loss coefficient of each room or zone of the premises, and then to sum the values obtained for the various rooms or zones so as to obtain the total heat loss coefficient of the premises.

In this text, a room of a premises is defined as being a space of the premises flanked by walls. A zone of a premises is moreover defined as being a space formed by several rooms of the premises which can be treated in a unitary manner, that is to say that, within the framework of the method of the invention, a single power measurement sensor and a single temperature measurement sensor can be provided for each zone of the premises.

According to a characteristic, the determination of the temperature of the outside air $T_{ek}$ takes place, within the framework of the method of the invention, by way of a campaign of measurements at closely-spaced time intervals. The measurements of the temperature of the outside air $T_{ek}$ can be simultaneous with the measurements of the inside temperature of the premises $T_{ik}$, that is to say performed at the same closely-spaced times.

As a variant, the determination of the temperature of the outside air $T_{ek}$ at closely-spaced time intervals can be obtained by interpolation of meteorological data at the site of the premises.

Preferably, the method according to the invention is implemented over a time period for which the temperature of the outside air $T_{ek}$ is stable.

The heat loss coefficient K determined in accordance with the invention integrates the contributions of the heat losses by transmission and infiltrations of air, that is to say:

$$K = H_T + m' \cdot Cp = UA_T + m' \cdot Cp.$$

If one wishes to access the heat transfer coefficient U of the premises, it is possible to decouple the contribution of the heat losses by transmission, on the one hand, and that of the infiltrations of air, on the other hand, by evaluating the air renewal flow rate m' into the premises.

When no fixed system for ventilating the premises is active in the course of the method for determining the coefficient K, the flow rate m' is equal to the renewal flow rate of air by infiltration. This flow rate m' can be determined by any appropriate process, in particular by a detection process using tracer gases or by a blower-door infiltrometry test, as described in WO 2012/028829 A1.

Another possibility for decoupling the contribution of the heat losses by transmission and the contribution of the infiltrations of air is to bring into the premises a ventilation system whose flow rate is imposed by the user in the course of the implementation of the method in accordance with the invention. This brought ventilation system may be, in particular, a system for pressurizing or depressurizing the premises of blower-door type.

Another subject of the invention is an information recording medium, comprising instructions for the implementation of all or some of the computation steps of a method for determining the heat loss coefficient K of a premises such as described hereinabove when these instructions are executed by an electronic computation unit, the computation steps comprising in particular:

the computation of the first heating power $P_1$ to be applied over the first time period $D_1$, on the basis of the values of $\alpha$, $\Delta T_1(0)$ and $K_{ref}$, the computation, over each time interval $\Delta t_1$ or $\Delta t_2$, of the slope $a_1$ or $a_2$ on the basis of the measurements of temperature inside the premises $T_{i1}$ or $T_{i2}$, the computation of the value $K_{calc}$ of the heat loss coefficient K of the premises on the basis of the slopes $a_1$ and $a_2$ and of the powers $P_1$ and $P_2$.

According to an advantageous characteristic, the information recording medium furthermore comprises instructions for the control, as a function of input data, of a controlled power source used to apply the first heating power $P_1$ in the premises.

A subject of the invention is also a device for the implementation of a method such as described hereinabove, which comprises:

at least one heating element comprising a controlled power source, at least one temperature sensor which measures a temperature inside the premises $T_{ik}$, at least one power sensor which measures the heating power $P_k$ delivered in the premises, at least one acquisition module for acquiring the measurements of temperature inside the premises $T_{ik}$, the measurements of heating power $P_k$ delivered in the premises, and the temperature of the outside air $T_{ek}$, an electronic computation unit, and an information recording medium comprising instructions, intended to be executed by the electronic computation unit, for the implementation of all or some of the computation steps of the method, which are: the computation of the first heating power $P_1$ to be applied over the first time period $D_1$, on the basis of the values of $\alpha$, $\Delta T_1(0)$ and $K_{ref}$; the computation, over each time interval $\Delta t_1$ or $\Delta t_2$, of the slope $a_1$ or $a_2$ on the basis of the measurements of temperature inside the premises $T_{i1}$ or $T_{i2}$ the computation of the value $K_{calc}$ of the heat loss coefficient K of the premises on the basis of the slopes $a_1$ and $a_2$ and of the powers $P_1$ and $P_2$.

According to an advantageous characteristic, each heating element of the device heats the air of the premises, thereby allowing fast heating of the premises. Such is the case in particular with electric heating mats as described previously, which are disposed vertically in the premises and rolled up, so that the whole of the thermal power is dissipated into the air.

According to another advantageous characteristic, each temperature sensor measures the temperature of the air inside the premises. In this case, for each room or zone of the premises, a single measurement in the air volume substantially at the center of the room or zone can suffice to obtain a value representative of the average temperature in the room or zone, on condition that the heating is sufficiently homogeneous.

The measurement of the temperature of the air inside the premises is simpler than the measurement of the temperature of walls. Indeed, if one chooses to carry out wall temperature measurements, it is necessary, in order to obtain a good estimation of the average temperature in a room or zone, to carry out temperature measurements on several walls of the room or zone, and then to determine an average of these wall temperatures, doing so whatever the homogeneity of the heating. The air temperature measurement therefore makes it possible to reduce the number of measurements to be performed within the framework of the method according to the invention, provided that it is carried out in a room or zone heated in a globally homogeneous manner. Through the combination of homogeneous heating of the premises and measurement of the temperature in the air inside the premises, the implementation of the method according to the invention is simplified and its duration is limited.

The or each power sensor can be a voltage sensor (voltmeter) and/or a current sensor (ammeter). Preferably, the or each power sensor is a wattmeter, furnished both with a voltage sensor and with a current sensor.

This allows accurate measurement of the power in the premises, while circumventing possible fluctuations of the mains voltage or the determination of the resistance of the or of each heating element.

In one embodiment, the device comprises at least one box which is situated in a room or zone of the premises and which comprises:

a power management module, to which is connected the power source of the or of each heating element situated in said room or zone of the premises, a temperature measurement module, to which is connected the or each temperature sensor situated in said room or zone of the premises, a power sensor, which measures the heating power delivered in said room or zone of the premises, connection means between the box and the electronic computation unit, in such a way that the electronic computation unit is able to receive the measurements of temperature and of power and to control the power management module.

The power management module of each box is intended to regulate the heating power applied in the room or zone of the premises. It may be a module for power management by switching, which toggles the heating element or elements between their on state and their off state, or a power management module able to vary the value of the power emitted by the heating element or elements.

In an advantageous manner, the device comprises a box in each room or zone of the premises.

Preferably, the connection means between the or each box and the electronic computation unit are wireless connection means.

According to an advantageous characteristic, the electronic computation unit comprises means of automatic control of the power source of the or of each heating element of the device. In particular, the electronic computation unit is advantageously configured to compute the value of the first heating power $P_1$ to be applied over the first time period $D_1$, on the basis of the values of $\alpha$, $\Delta T_1(0)$ and $K_{ref}$, and to control the power source of the or of each heating element so as to generate in the premises the computed value of the first heating power $P_1$ over the first time period $D_1$.

By way of example, according to a first variant, a test which may be launched in an autonomous manner by such an automatic control device comprises the following sequence of steps:
launching of the procedure;
computation of the value of the first heating power $P_1$ to be applied over the first time period $D_1$, on the basis of the values of $\alpha$, $\Delta T_1(0)$ and $K_{ref}$;
setting into operation of the heating element or elements so as to reach the computed value of the first heating power $P_1$, recording of the heating curve $T_{i1}(t)$ for a pre-established duration, in particular of the order of 4 hours, and then stopping of the heating element or elements;
recording of the cooling curve $T_{i2}(t)$ for a pre-established duration, in particular of the order of 4 hours;
computation of the values of the slopes $a_1$ and $a_2$ of the tangents to the cooling curves $T_{i1}(t)$ and $T_{i2}(t)$ and, on the basis of the values of the slopes $a_1$ and $a_2$ and of the powers $P_1$ and $P_2$, computation of the value $K_{calc}$ of the heat loss coefficient of the premises.

According to a second variant, a test which may be launched in an autonomous manner by such an automatic control device comprises the following sequence of steps:
launching of the procedure;
computation of the value of the first heating power $P_1$ to be applied over the first time period $D_1$, on the basis of the values of $\alpha$, $\Delta T_1(0)$ and $K_{ref}$;
setting into operation of the heating element or elements so as to reach the computed value of the first heating power $P_1$;
when the evolution $T_{i1}(t)$ of the temperature measured inside the premises in the course of the heating of the premises is substantially linear and the temperature of the outside air $T_{e1}$ is stable in relation to the predefined criteria, computation and storage of the value of the slope $a_1$ of the tangent to the heating curve $T_{i1}(t)$ and stopping of the heating element or elements;
when the evolution $T_{i2}(t)$ of the temperature measured inside the premises in the course of the cooling of the premises is substantially linear and the temperature of the outside air $T_{e2}$ is stable in relation to the predefined criteria, computation and storage of the value of the slope $a_2$ of the tangent to the cooling curve $T_{i2}(t)$;
on the basis of the stored values of the slopes $a_1$ and $a_2$ and of the values of the powers $P_1$ and $P_2$, computation of the value $K_{calc}$ of the heat loss coefficient of the premises.

In these two variants, the or each heating element of the device can be a heating element tied to the tested premises or a heating element added specifically for carrying out the trials. Likewise, the temperature measurement sensors of the device can be tied to the premises or additional.

According to an advantageous characteristic, the control software internal to the device is designed in such a way that each test launched in an autonomous manner by the automatic control device is preferably launched at night, and, if previous measurements have already been carried out, the automatic control device optimizes the cycle of each test so as to minimize its duration and to maximize the accuracy of characterization.

Preferably, the criteria of the method that are used by the automatic control device take account of the accuracy of the temperature measurement, that is to say of the accuracy in determining the slope of the temperature evolution. The lower the accuracy of the measurement, the longer the measurement time must be to ensure correct slope determination.

The characteristics and advantages of the invention will become apparent in the description which follows of several embodiments of a method and of a device according to the invention, given solely by way of example and while referring to the appended FIGS. 1 to 6 in which.

Figure 2:
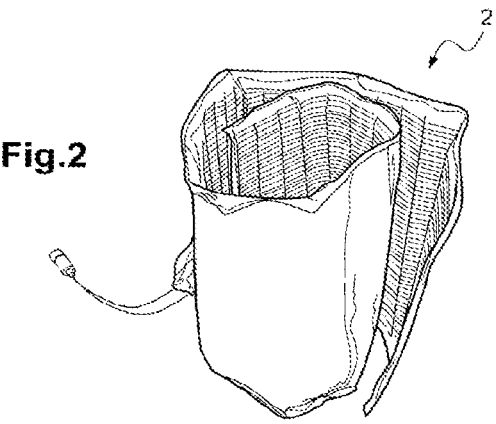
FIG. 2 is a perspective view of an electric heating mat that can be used to heat the premises within the framework of the method according to the invention, which is shown in a vertical position, while being rolled up, thereby making it possible to dissipate the whole of the thermal power into the air.
Figure 3:
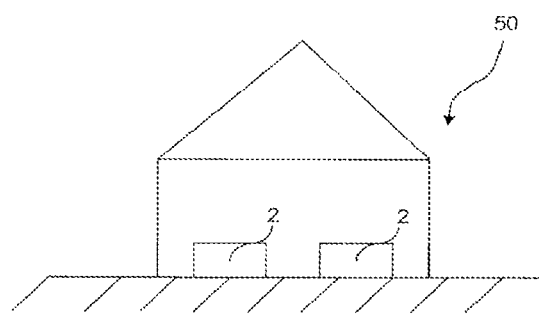
FIG. 3 is a schematic view of an individual house of which one wishes to determine the heat loss coefficient K in accordance with the invention, the heating of the house being ensured by electric heating mats such as shown in FIG. 2, which are brought into the house.
Figure 5:
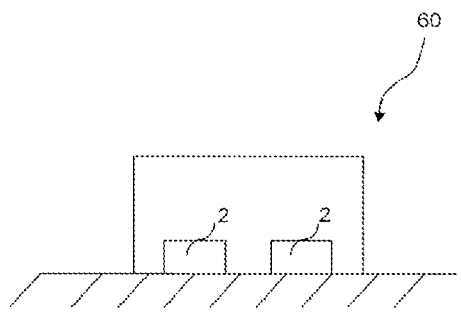
Figure 4:
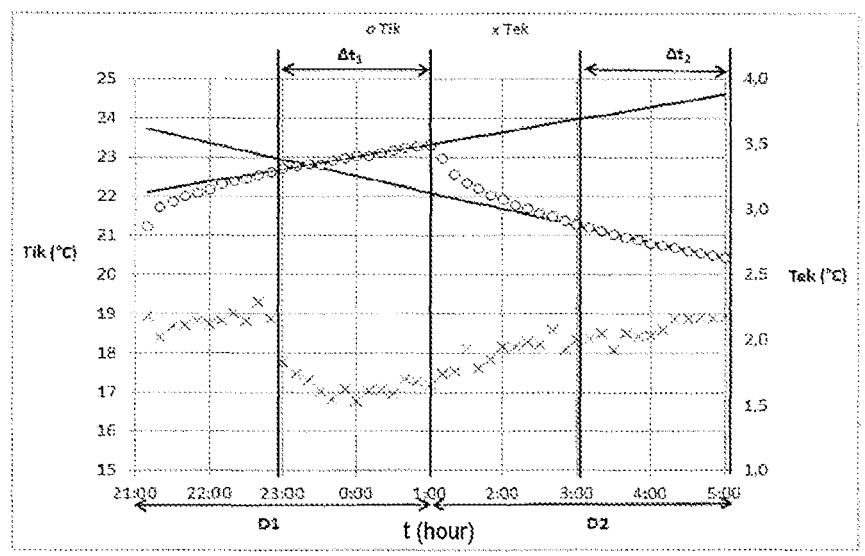
Figure 6:
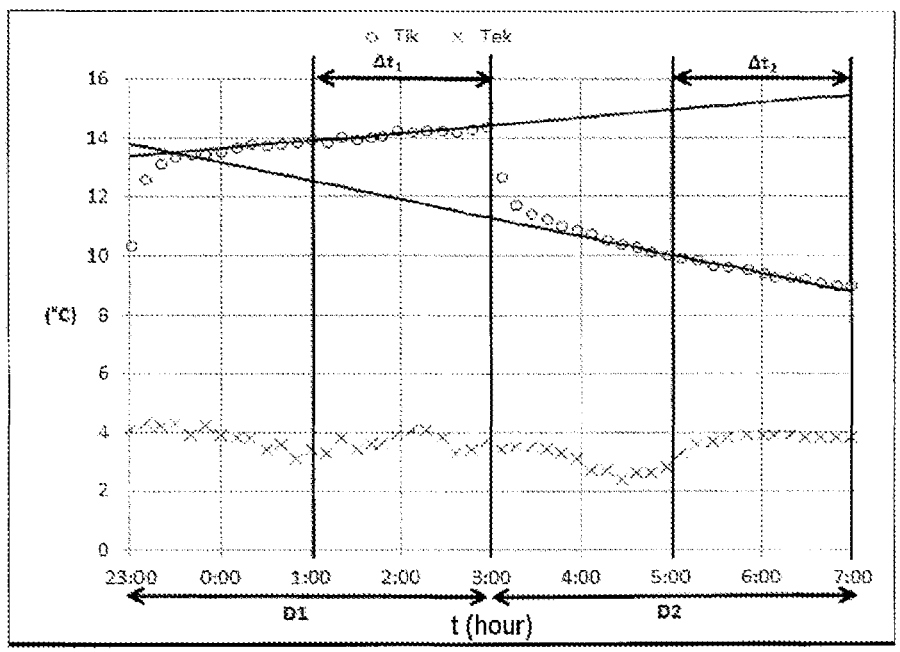

FIG. 4 is a curve representative of the evolution of the temperature $T_{ik}$ inside the house of FIG. 3 as a function of time in the course of the implementation of the method in accordance with the invention, showing a first time period $D_1$ in the course of which a first heating power $P_1$ is applied in the house, where $P_1$ is such that the parameter $$\alpha = 1 - \frac{\Delta T_1(0) K_{ref}}{P_1}$$

of the house is substantially equal to 0.5, followed by a second time period $D_2$ in the course of which a substantially zero second heating power $P_2$ is applied in the house, so as to allow the house to cool freely, the evolution of the temperature of the outside air $T_{ek}$ also being shown in this figure;

FIG. 5 is a schematic view of a bungalow of which one wishes to determine the heat loss coefficient K in accordance with the invention, the heating of the bungalow being ensured by electric heating mats such as shown in FIG. 2, which are brought into the bungalow; and FIG. 6 is a curve representative of the evolution of the temperature $T_{ik}$, inside the bungalow of FIG. 5 as a function of time in the course of the implementation of the method in accordance with the invention, showing a first time period $D_1$ in the course of which a first heating power $P_1$ is applied in the bungalow, where $P_1$ is such that the parameter $$\alpha = 1 - \frac{\Delta T_1(0) K_{ref}}{P_1}$$

of the bungalow is substantially equal to 0.5, followed by a second time period $D_2$ in the course of which a substantially zero second heating power $P_2$ is applied in the bungalow, so as to allow the bungalow to cool freely, the evolution of the temperature of the outside air $T_{ek}$ also being shown in this figure.

Figure 1:
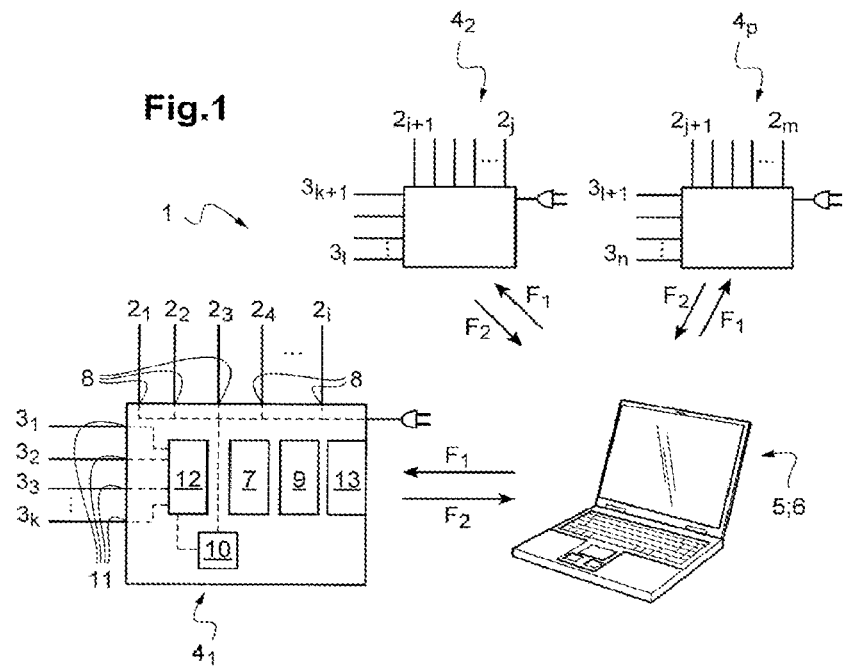
FIG. 1 is a schematic diagram of a device for the implementation of a method in accordance with the invention for determining the heat loss coefficient K of a premises.

FIG. 1 shows a schematic diagram of a device 1 for the determination of the heat loss coefficient K of a premises in accordance with the method of the invention.

The device 1 comprises:
- a plurality of heating elements $2_1, 2_2, \ldots, 2_m$, which are for example electric heating mats, an example of which is shown in FIG. 2;
- a plurality of temperature sensors $3_1, 3_2, \ldots, 3_n$, which are for example thermocouples of type K or Pt100 probes, for the measurement of the inside temperature of the premises;
- a plurality of boxes $4_1, 4_2, \ldots, 4_p$;
- an electronic computation unit 5, which is for example a computer of portable PC type and which integrates a wireless communication module;
- a software application 6 comprising instructions intended to be executed by the electronic computation unit 5, for the implementation of all or some of the computation steps of the method, viz.: the computation of the first heating power $P_1$ to be applied over the first time period $D_1$, on the basis of the values of $\alpha$, $\Delta T_1(0)$ and $K_{ref}$; the computation, over each time interval $\Delta t_1$ or $\Delta t_2$, of the slope $a_1$ or $a_2$ on the basis of the measurements of temperature inside the premises $T_{i1}$ or $T_{i2}$ the computation of the value $K_{calc}$ of the heat loss coefficient K of the premises on the basis of the slopes $a_1$ and $a_2$ and of the powers $P_1$ and $P_2$.

The heating elements $2_1, 2_2, \ldots, 2_m$ are intended to be distributed in the various rooms or zones of the premises of which one wishes to determine the heat loss coefficient K, the number of heating elements being adapted as a function of the value of the first heating power $P_1$ to be applied. At least one heating element $2_i$ and at least one temperature sensor $3_i$ are provided in each room or zone of the premises.

In an advantageous manner, a box $4_i$ is associated with each room or zone of the premises. Each box $4_i$ comprises an electrical power supply 7, ports 8 for connecting with the heating element or elements $2_i$ of the room or zone, and a power switching module 9 making it possible to toggle the heating elements $2_i$ between their off state and their on state. Each box $4_i$ is intended to be plugged into the mains so as to electrically supply the heating element or elements $2_i$ of the room or zone.

Each box $4_i$ also comprises a power sensor 10, which is for example a wattmeter, and ports 11 for connecting with the temperature sensor or sensors $3_i$ of the room or zone. The power sensor 10 and the ports 11 for connecting with the temperature sensors $3_i$ of the room or zone are connected to a module 12 for acquiring the measurements of inside temperature and of power performed in the room or zone. The electrical power supply 7 serves to supply the switching module 9 and the acquisition module 12.

Moreover, each box $4_i$ comprises a wireless communication module 13, which makes it possible to establish a connection between the box $4_i$ and the electronic computation unit 5 for the transmission of information from one to the other, as shown by the arrows $F_1$ and $F_2$. In particular, the wireless communication module 13 allows the dispatching of control instructions from the electronic computation unit 5 to the power switching module 9 for the driving of the heating element or elements $2_i$ of the room or zone, as well as the transmission of the temperature and power measurements carried out in the room or zone from the acquisition module 12 to the electronic computation unit 5.

When the determination of the temperature of the outside air takes place, within the framework of the method, by way of a campaign of measurements at closely-spaced time intervals, the device 1 also comprises at least one sensor (not represented) for measuring the temperature of the outside air. This sensor for measuring the outside temperature is then connected to a port of one of the boxes $4_i$, so that the measurements of the temperature of the outside air are received by the acquisition module 12 of this box.

EXAMPLE 1

With reference to FIG. 3, the method according to the invention is implemented for the determination of the heat loss coefficient K of an individual house 50 of recent construction, exhibiting interior insulation composed of a lounge, a kitchen, a bathroom, and two bedrooms, distributed over two floors. The ventilation system is a dual-flow ventilation coupled to a climatic well. The method is implemented whilst the house is unoccupied and the ventilation system is deactivated, all the ventilation ports being blocked off.

The heating of the house 50 is ensured by electric heating mats 2, an example of which is shown in FIG. 2, where each heating mat has a power of about 110 W. The heating mats 2 are distributed in the various rooms of the house while being placed vertically and rolled up, as shown in FIG. 2. Thus, the whole of the thermal power is dissipated into the air, thereby allowing fast and homogeneous heating of the house. The heating mats 2 constitute a controlled power source very suitable for generating the pulse for heating the house required by the method during the first time period $D_1$.

The method is implemented continuously in its entirety over a single time period, as is visible in FIG. 4 where the second time period $D_2$, corresponding to a substantially zero heating power of the house $P_2$, immediately follows the first time period $D_1$, corresponding to a strictly positive heating power of the house $P_1$.

In the example of FIG. 4, the method takes place over a continuous time period having a duration of about 8 hours, which begins at the start of the night around 21 h and terminates around 5 h. Under these conditions, the contribution of the solar radiation to the heating of the house is zero.

Moreover, no power source other than the heating mats 2 is active in the house 50 in the course of the method. Thus, for each time period $D_k$, the power $P_k$ applied is substantially equal to the heating power imposed by the heating mats 2, to within the residual powers, originating in particular from the measurement hardware and computation hardware present in the house for the implementation of the method. During the implementation of the method, power sensors, in the form of loop ammeters, measure the power delivered in several rooms of the house.

In a first step of the method, which corresponds to the first time period $D_1$, the heating of the house 50 is undertaken with the aid of the heating mats 2. In this example, in accordance with the invention, the first heating power $P_1$ applied over the first time period $D_1$ is chosen in such a way that the parameter $$\alpha = 1 - \frac{\Delta T_1(0) K_{ref}}{P_1}$$

is substantially equal to 0.5. In this example, the reference value $K_{ref}$, obtained within the framework of a thermal study of the house, is equal to 94 W/K, the initial inside temperature inside the house $T_{i1d}$ is 21.2° C., and the initial temperature of the outside air $T_{e1d}$ is 2.2° C., this corresponding to a value of the first heating power $P_1$ equal to about 3738.9 W.

The ambient temperature inside the house $T_{i1}$ is then measured every minute in each of the five rooms of the house, namely the lounge, the kitchen, the bathroom and the two bedrooms. For this purpose, a temperature sensor, which in this example is a Pt100 platinum resistance thermometer, is installed in each of these rooms, in the ambient air at a height of about 200 cm, above the doors.

In this example, the measured evolution of the inside temperature is almost identical for the five rooms of the house 50 since the heating of the house is particularly homogeneous. In FIG. 4, only the evolution of the ambient temperature inside the lounge is represented, it being understood that the evolution of the ambient temperature inside the other rooms of the house has a similar profile.

The curve representative of the evolution of the inside temperature of the house $T_{i1}$ as a function of time during the first time period $D_1$ is shown in FIG. 4. As visible in this figure, the temperature rise curve of the house 50 exhibits a substantially linear part over the time interval $\Delta t_1$. This linear part of the curve fits the following equation: $T_{i1}=22.1°$ C.+0.00531 t, with t in minutes.

FIG. 4 also depicts the evolution of the temperature of the outside air $T_{e1}$ during the first time period $D_1$. The temperature of the outside air $T_{e1}$ over the time interval $\Delta t_1$ is sufficiently stable for it to be possible to consider it substantially constant and equal to the average temperature over the time interval $\Delta t_1$, namely in this example $T_{e1m}=1.9°$ C.

In a second step of the method, which corresponds to the second time period $D_2$, the substantially zero second heating power $P_2$ is applied in the house 50, from a starting temperature $T_{i2d}=23.3°$ C., that is to say the heating mats 2 do not operate during this second period $D_2$. As in the first step, the ambient temperature inside the house $T_{i2}$ is then measured every minute, by means of five temperature sensors, which are Pt100 platinum resistance thermometers, installed in each room of the house, each time in the ambient air at a height of 200 cm. Here again, the measurements show that the evolution of the inside temperature is almost identical for the five rooms of the house.

FIG. 4 shows the curve representative of the evolution of the inside temperature of the house $T_{i2}$ as a function of time during the second time period $D_2$. As visible in this figure, the temperature fall curve of the house 50 exhibits a substantially linear part over the time interval $\Delta t_2$. This linear part of the curve fits the following equation: $T_{i2}=22.1°$ C.−0.00703 t, with t in minutes.

The evolution of the temperature of the outside air $T_{e2}$ during the second time period $D_2$ is also shown in FIG. 4. Just as in the first step, the temperature of the outside air $T_{e2}$ over the time interval $\Delta t_2$ is sufficiently stable for it to be possible to consider it substantially constant and equal to the average temperature over the time interval $\Delta t_2$, namely in this example $T_{e2m}=2.0°$ C.

As $$K_{calc} = \frac{a_1 P_2 - a_2 P_1}{a_1 \Delta T_{2m} - a_2 \Delta T_{1m}}$$

in accordance with equation (2) above, by taking $\Delta T_{1m}=21.0°$ C., $\Delta T_{2m}=19.0°$ C., $P_1=3738.9$ W, $P_2=153.5$ W, we obtain the value of the heat loss coefficient K of the house 50:

$K_{calc}=109.0$ W/K.

The method of the invention also makes it possible to access the value of the effective heat capacity C or inertia of the house 50, such as defined previously, namely the energy required to increase the ambient temperature of the house by 1 K at constant outside temperature for the duration of the impulse:

$C=17.7$ MJ/K.

EXAMPLE 2

With reference to FIGS. 5 and 6, the method according to the invention is implemented for the determination of the heat loss coefficient K of a bungalow 60 exhibiting a floor area of 12.4 m², an inside height of 2.4 m, a volume of 29.76 m³ and a total envelope area of 62.7 m². The external wall of the bungalow 60 consists of insulating sandwich panels comprising a 4 cm thick polyurethane layer inserted between two metal plates, a door and two triple-glazed windows.

Additional insulation has been added to the envelope, which comprises the following materials:
  6 cm of glass wool, 13 mm plasterboard and a layer of about 1 cm of sprayed plaster for the walls;
  3 cm of expanded polystyrene for the floor and the ceiling, the floor also being covered with oriented strand board (OSB).

The method is implemented whilst the bungalow 60 is unoccupied.

A thermal study of the bungalow 60 provides a reference value $K_{ref}$ of 32.7 W/K. The bungalow is a very lightweight building; its time constant is a few hours.

As in Example 1, the heating of the bungalow 60 is ensured by electric heating mats 2, such as shown in FIG. 2, where each heating mat has a power of about 110 W. The heating mats 2 are distributed in the bungalow by being placed vertically and rolled up, as shown in FIG. 2, thereby allowing fast and homogeneous heating of the bungalow.

The method according to the invention is implemented continuously in its entirety over a single nocturnal time period, so as to circumvent the contribution of the solar radiation to the heating of the bungalow 60. A heating of the bungalow is undertaken firstly over a first time period $D_1$ from 23 h to 3 h, thereby corresponding to the application of a strictly positive first heating power $P_1$, and then to a free cooling of the bungalow over a second time period $D_2$ from 3 h to 7 h, thereby corresponding to the application of a substantially zero second heating power $P_2$. The second time period $D_2$ thus immediately follows the first time period $D_1$.

No power source other than the heating mats 2 is active in the bungalow 60 in the course of the method. Thus, for each time period $D_k$, the power $P_k$ applied is substantially equal to the heating power imposed by the heating mats 2, to within the residual powers, originating in particular from the measurement hardware and computation hardware present in the house for the implementation of the method. Power sensors, in the form of loop ammeters, measure the power delivered in the bungalow during the implementation of the method.

In a first step of the method, which corresponds to the first time period $D_1$, the heating of the bungalow 60 is undertaken with the aid of the heating mats 2. In this example, in accordance with the invention, the first heating power $P_1$ applied over the first time period $D_1$ is chosen in such a way that the parameter $$\alpha = 1 - \frac{\Delta T_1(0) K_{ref}}{P_1}$$

is substantially equal to 0.5. In this example, the reference value $K_{ref}$ is equal to 32.7 W/K, the initial inside temperature inside the bungalow $T_{i1d}$ is 10.4° C., and the initial temperature of the outside air $T_{e1d}$ is 4.1° C., this corresponding to a value of the first heating power $P_1$ equal to about 432.8 W.

The ambient temperature inside the bungalow $T_{i1}$ is then measured every ten seconds. For this purpose, a temperature sensor, which in this example is a thermocouple of type K, is installed in the bungalow, in the ambient air at a height of 180 cm.

The curve representative of the evolution of the inside temperature of the bungalow $T_{i1}$ as a function of time during the first time period $D_1$ is shown in FIG. 6. As visible in this figure, the temperature rise curve of the bungalow 60 exhibits a substantially linear part over the time interval $\Delta t_1$. This linear part of the curve fits the following equation: $T_{i1}$=13.4° C.+0.00413 t, with t in seconds.

FIG. 6 also depicts the evolution of the temperature of the outside air $T_{e1}$ during the first time period $D_1$. The temperature of the outside air $T_{e1}$ over the time interval $\Delta t_1$ is sufficiently stable for it to be possible to consider it substantially constant and equal to the average temperature over the time interval $\Delta t_1$, namely in this example $T_{e1m}$=3.8° C.

In a second step of the method, which corresponds to the second time period $D_2$, the substantially zero second heating power $P_2$ is applied in the bungalow 60, from a starting temperature $T_{i2d}$=14.4° C., that is to say the heating mats 2 do not operate during this second period $D_2$. As in the first step, the ambient temperature inside the bungalow $T_{i2}$ is then measured every ten seconds, by means of a thermocouple of type K placed at the center of the bungalow, in the ambient air at a height of 180 cm.

FIG. 6 shows the curve representative of the evolution of the inside temperature of the bungalow $T_{i2}$ as a function of the time during the second time period $D_2$. As visible in this figure, the temperature fall curve of the bungalow 60 exhibits a substantially linear part over the time interval $\Delta t_2$. This linear part of the curve fits the following equation: $T_{i2}$=11° C.−0.00871 t, with t in seconds.

The evolution of the temperature of the outside air $T_{e2}$ during the same time period $D_2$ is also shown in FIG. 6. As in the first step, the temperature of the outside air $T_{e2}$ over the time interval $\Delta t_2$ is sufficiently stable for it to be possible to consider it substantially constant and equal to the average temperature over the time interval $\Delta t_2$, namely in this example $T_{e2m}$=3.4° C.

As $$K_{calc} = \frac{a_1 P_2 - a_2 P_1}{a_1 \Delta T_{2m} - a_2 \Delta T_{1m}}$$

in accordance with equation (2) above, by taking $\Delta T_{1m}$=10.5° C., $\Delta T_{2m}$=5.7° C., $P_1$=432.8 W, $P_2$=11.0 W, we obtain the value of the heat loss coefficient K of the bungalow 60:

$K_{calc}$=33.2 W/K.

The method of the invention also makes it possible to access the value of the effective heat capacity C or inertia of the bungalow 60, such as defined previously, namely the energy required to increase the ambient temperature of the bungalow by 1 K at constant outside temperature for the duration of the impulse:

C=1.3 MJ/K.

In practice, in the two examples hereinabove, the steps of selecting the time intervals $\Delta t_k$ for the processing of the data, of linearizing, and of computing the value $K_{calc}$ of the heat loss coefficient on the basis of the slopes $a_k$, are advantageously carried out by means of an electronic computation unit belonging to a device such as described with reference to FIG. 1.

The invention is not limited to the examples described hereinabove. In particular, as already mentioned, the method according to the invention can be implemented equally with heating means fitted to the premises in a fixed manner or with heating means which are brought into the premises specifically for the implementation of the method, so long as the power provided by these heating means for the pulses required by the method can be determined in an accurate manner.

Moreover, in the case of a premises of large size, such as a property with several floors, the method of the invention can be used either for the determination of the heat loss coefficient K of the premises in its entirety, in which case the heating of the air must be ensured throughout the premises, or for the determination of the heat loss coefficient K of just a part of the premises. Thus, in the case of a property, it is possible to test only a single apartment of the property. Accordingly, it is preferable that the parts adjoining the measured apartment be in a thermal state representative of their normal state of occupancy, in particular that the normally inhabited adjoining parts be at an ambient temperature of the order of 20° C. It is also preferable to minimize the heat losses as far as possible, for example by over-insulating the partition walls by means of add-on insulation, or else by conditioning the adjoining parts in the same manner as the measured apartment so as to ensure a temperature disparity on either side of the partition wall that is as close to zero as possible.

However, an advantage of the method according to the invention is that it limits the heat transfers between the measured apartment and the adjoining parts, by virtue of the reduction in the measurement time. There is thus less need to make corrections to the value $K_{calc}$ obtained of the heat loss coefficient. The method in accordance with the invention is thus particularly well suited to determining the heat loss coefficient of parts of apartment block properties.

The invention claimed is:

1. A method for reducing a value $K_{calc}$ of a heat loss coefficient K of a premises, comprising:
undertaking, in the premises, over two successive time periods $D_1$ and $D_2$ :

i. over the first time period $D_1$, an application of a first heating power $P_1$ of the premises, a campaign of measurements of at least one temperature inside the premises $T_{i1}$ at closely-spaced time intervals, and a determination of the temperature of an outside air $T_{e1}$ at closely-spaced time intervals, the first heating power $P_1$ being such that a parameter $$\alpha = 1 - \frac{\Delta T_1(0)K_{ref}}{P_1}$$

is less than or equal to 0.8 with $\Delta T_1(0) = T_{i1}(t=0) - T_{em}$, where $t=0$ is a starting point of the first time period $D_1$, $T_{em}$ is an average temperature of the outside air over all of the time periods $D_1$ and $D_2$ and $K_{ref}$ is a reference value of a heat loss coefficient K of the premises, and then ii. over the second time period $D_2$, the application of a substantially zero second heating power $P_2$ of the premises, the campaign of measurements of at least one temperature inside the premises $T_{i2}$ at closely-spaced time intervals, and the determination of the temperature of the outside air $T_{e2}$ at closely-spaced time intervals;

selecting for each of the first and second time periods $D_1$ and $D_2$, a time interval $\Delta t_1$ or $\Delta t_2$ for which an evolution $T_{i1}(t)$ or $T_{i2}(t)$ is substantially linear, where the time intervals $\Delta t_1$ and $\Delta t_2$ are such that the time interval $\Delta t_1$ extends up to an end of the first period $D_1$ of application of the first heating power $P_1$ and such that, when the starting points of the first period $D_1$ and of the second period $D_2$ are superimposed, the time intervals $\Delta t_1$ and $\Delta t_2$ have a same end point;

determining a slope $a_1$ or $a_2$ of a tangent to a curve $(T_{ik}(t))_{k=1 \text{ or } 2}$ over each time interval $\Delta t_1$ or $\Delta t_2$;

determining the value $K_{calc}$ of the heat loss coefficient K of the premises based on the slopes $a_1$ and $a_2$;

controlling the error in the value $K_{calc}$ of the heat loss coefficient K of the premises by controlling the parameter $\alpha$ less than or equal to 0.8; and reducing the value $K_{calc}$ of the heat loss coefficient K of the premises based on the controlled error, the value $K_{calc}$ of the heat loss coefficient K of the premises being greater than or equal to 80% of the heat loss coefficient K of the premises and less than or equal to 120% of the heat loss coefficient K of the premises.

2. The method as claimed in claim 1, wherein the time intervals $\Delta t_1$ and $\Delta t_2$ have a same duration.

3. The method as claimed in claim 1, wherein the first time period $D_1$, over which the first heating power $P_1$ is applied, has a duration of less than or equal to 4 hours.

4. The method as claimed in claim 1, wherein the first heating power $P_1$ is such that the parameter $$\alpha = 1 - \frac{\Delta T_1(0)K_{ref}}{P_1}$$

is less than or equal to 0.75.

5. The method as claimed in claim 1, wherein the first heating power $P_1$ is such that the parameter $$\alpha = 1 - \frac{\Delta T_1(0)K_{ref}}{P_1}$$

is less than or equal to 0.7.

6. The method as claimed in claim 1, wherein the first heating power $P_1$ is such that the parameter $$\alpha = 1 - \frac{\Delta T_1(0)K_{ref}}{P_1}$$

is greater than or equal to 0.25.

7. The method as claimed in claim 1, subsequent to the determination of the value $K_{calc}$ of the heat loss coefficient K of the premises based on the slopes $a_1$ and $a_2$, the method further comprising:

computing and verifying a value of the parameter $$\alpha_{calc} = 1 - \frac{\Delta T_1(0)K_{calc}}{P_1},$$

wherein $\alpha_{calc}$ is in a predefined range of values for the parameter $\alpha$.

8. The method as claimed in claim 1, wherein the reference value $K_{ref}$ of the heat loss coefficient K of the premises is determined based on the heat transfer coefficient of an envelope of the premises obtained according to the standard ISO 13789:2007.

9. The method as claimed in claim 1, wherein the first heating power $P_1$ includes a heating power $P_{imp1}$ imposed by a controlled power source.

10. The method as claimed in claim 1, wherein the method is implemented whilst the premises is unoccupied.

11. The method as claimed in claim 1, wherein, over each of the first and second time periods $D_1$ and $D_2$, the temperature of the outside air $T_{e1}$ or $T_{e2}$ is stable.

12. The method as claimed in claim 1, wherein, over each of the first and second time periods $D_1$ and $D_2$, a solar radiation is low.

13. The method as claimed in claim 1, wherein the method is carried out in its entirety over a single nocturnal period.

14. The method as claimed in claim 1, wherein, over each of the first and second time periods $D_1$ and $D_2$ any fixed ventilation system fitted to the premises is deactivated.

15. An information recording medium including instructions for implementation of a method for reducing the heat loss coefficient K of a premises when the instructions are executed by an electronic computation unit, the method comprising:

determining a first heating power $P_1$ to be applied over a first time period $D_1$ based on values of $\alpha$, $\Delta T_1(0)$ and $K_{ref}$, the first heating power $P_1$ being such that a parameter $$\alpha = 1 - \frac{\Delta T_1(0)K_{ref}}{P_1}$$

is less than or equal to 0.8 with $\Delta T_1(0) = T_{i1}(t=0) - T_{em}$, where $t=0$ is a starting point of the first time period $D_1$, $T_{em}$ is an average temperature of the outside air over all of the time periods $D_1$ and $D_2$ and $K_{ref}$ is a reference value of a heat loss coefficient K of the premises;

applying the first heating power $P_1$ of the premises, campaigning measurements of at least one temperature inside the premises $T_{i1}$ at closely-spaced time intervals, and determining the temperature of an outside air $T_{e1}$ at closely-spaced time intervals, over the first time period $D_1$;

determining, over each time interval $\Delta t_1$ or $\Delta t_2$, the slope $a_1$ or $a_2$ based on the measurements of the temperature inside the premises $T_{i1}$ or $T_{i2}$;

applying a substantially zero second heating power $P_2$ of the premises, campaigning measurements of at least one temperature inside the premises $T_{i2}$ at closely-spaced time intervals, and determining the temperature of the outside air $T_{e2}$ at closely-spaced time intervals, over the second time period $D_2$;

selecting for each of the first and second time periods $D_1$ and $D_2$, a time interval $\Delta t_1$ or $\Delta t_2$ for which an evolution $T_{i1}(t)$ or $T_{i2}(t)$ is substantially linear, the time interval $\Delta t_1$ extending up to an end of the first period $D_1$ of application of the first heating power $P_1$, and when the starting points of the first period $D_1$ and of the second period $D_2$ are superimposed, the time intervals $\Delta t_1$ and $\Delta t_2$ have a same end point;

determining a slope $a_1$ or $a_2$ of a tangent to a curve $(T_{ik}(t))_{k=1 \text{ or } 2}$ over each time interval $\Delta t_1$ or $\Delta t_2$;

determining the value $K_{calc}$ of the heat loss coefficient K of the premises based on the slopes $a_1$ and $a_2$;

controlling the error in the value $K_{calc}$ of the heat loss coefficient K of the premises by controlling the parameter $\alpha$ less than or equal to 0.8; and reducing the value $K_{calc}$ of the heat loss coefficient K of the premises based on the controlled error, the value $K_{calc}$ of the heat loss coefficient K of the premises being greater than or equal to 80% of the heat loss coefficient K of the premises and less than or equal to 120% of the heat loss coefficient K of the premises.

16. The information recording medium as claimed in claim 15, further comprising controlling, as a function of input data, a controlled power source used to apply the first heating power $P_1$ in the premises.

17. A device for reducing a value $K_{calc}$ of a heat loss coefficient K of a premises, the device comprising:

at least one heating element including a controlled power source;

at least one temperature sensor measuring temperature inside the premises $T_{ik}$ and temperature of outside air $T_{ek}$;

at least one power sensor measuring a heating power $P_k$ delivered in the premises; and $T_{ik} P_k T_{ek}$ processing circuitry configured to determine a first heating power $P_1$ to be applied over a first time period $D_1$, based on values of $\alpha$, $\Delta T_1(0)$ and $K_{ref}$, over the first time period $D_1$, by applying the first heating power $P_1$ of the premises, campaigning of measurements of at least one temperature inside the premises $T_{i1}$ at closely-spaced time intervals, and determining the temperature of the outside air $T_{e1}$ at closely-spaced time intervals, the first heating power $P_1$ being such that a parameter $$\alpha = 1 - \frac{\Delta T_1(0) K_{ref}}{P_1}$$

is less than or equal to 0.8 with $\Delta T_1(0) = T_{i1}(t=0) - T_{em}$, where $t=0$ is a starting point of the first time period $D_1$, $T_{em}$ is an average temperature of the outside air over all of the time periods, and $K_{ref}$ is a reference value of a heat loss coefficient K of the premises, determine, over each time interval $\Delta t_1$ or $\Delta t_2$, a slope $a_1$ or $a_2$ based on the measurements of the temperature inside the premises $T_{i1}$ or $T_{i2}$, over a second time period $D_2$, by applying a substantially zero second heating power $P_2$ of the premises, campaigning measurements of at least one temperature inside the premises $T_{i2}$ at closely-spaced time intervals, and determining the temperature of the outside air $T_{e2}$ at closely-spaced time intervals, determine the value $K_{calc}$ of the heat loss coefficient K of the premises based on the slopes $a_1$ and $a_2$, control the error in the value $K_{calc}$ of the heat loss coefficient K of the premises by controlling the parameter $\alpha$ less than or equal to 0.8, and reduce the value $K_{calc}$ of the heat loss coefficient K of the premises based on the controlled error, the value $K_{calc}$ of the heat loss coefficient K of the premises being greater than or equal to 80% of the heat loss coefficient K of the premises and less than or equal to 120% of the heat loss coefficient K of the premises.

18. The device as claimed in claim 17, wherein the at least one heating element heats the air of the premises.

19. The device as claimed in claim 17, wherein the at least one temperature sensor measures the temperature of air inside the premises.

20. The device as claimed in claim 17, wherein the processing circuitry is further configured to control the power source of the at least one heating element.

21. The device as claimed in claim 17, further comprising at least one box located in a room or zone of the premises, wherein the at least one box includes the at least one power sensor measuring the heating power delivered in the room or zone of the premise, the at least one power sensor being connected to the at least one temperature sensor located in said room or zone of the premises, and wherein the processing circuitry connected to the at least one box is further configured to receive the measurements of the temperature and of the heating power, and to control the heating power in the room or zone of the premise.

22. The device as claimed in claim 21, wherein the at least one box further includes a box in each room or zone of the premises.

23. The device as claimed in claim 21, the at least one box and the processing circuitry are connected by wireless connection.

* * * * *